Oct. 22, 1957   R. C. LEWIS   2,810,842
VIBRATION GENERATOR

Filed June 23, 1955   3 Sheets-Sheet 1

Inventor
Robert C. Lewis
by George W. Price
Att'y.

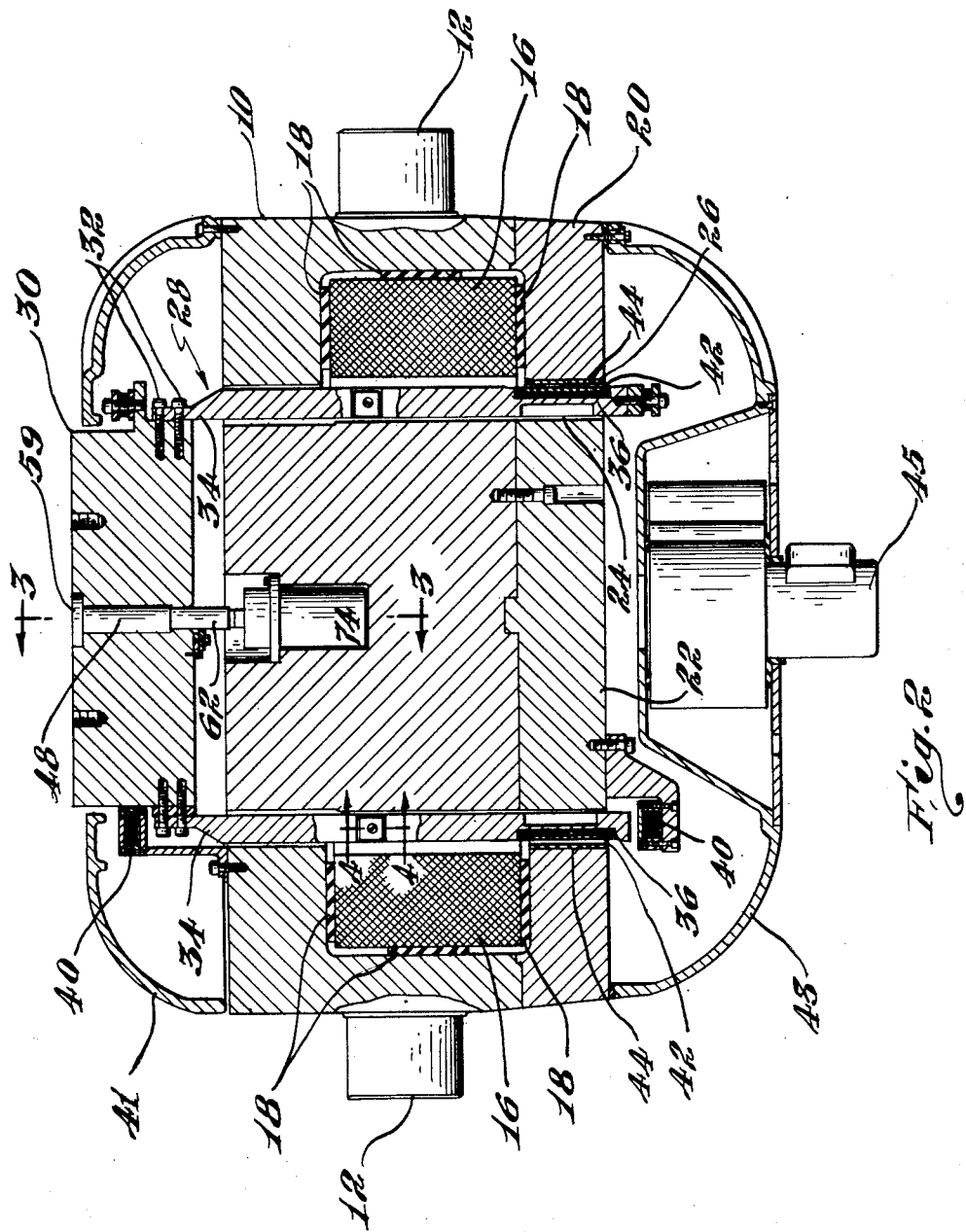

Oct. 22, 1957  R. C. LEWIS  2,810,842
VIBRATION GENERATOR
Filed June 23, 1955  3 Sheets-Sheet 3

Inventor
Robert C. Lewis
by George W. Price
Att'y

United States Patent Office

2,810,842
Patented Oct. 22, 1957

2,810,842
VIBRATION GENERATOR

Robert C. Lewis, Winchester, Mass., assignor to The Calidyne Company, Winchester, Mass., a copartnership consisting of Robert C. Lewis, Philip C. Efromson, and Thomas Gonzoule Application June 23, 1955, Serial No. 517,543

5 Claims. (Cl. 310—27)

This invention relates to electrodynamic apparatus such as is used to impart a reciprocating mechanical movement to an interconnected load.

As in all devices having moving elements, vibration generators or "shakers" have one or more critical operating frequencies corresponding to the natural resonating frequencies of their structures at which both the amplitude of movement and forces exerted by the moving elements are much greater than at other frequencies and may, if suitable precautions are not taken, become great enough to damage or destroy the apparatus. In shakers as manufactured heretofore, several arrangements have been employed to alleviate the above-mentioned resonating conditions, it having been the practice to build the moving armature structure as stiff and rigid as possible so that the resonating frequency is not within the normal operating range of the shaker. It has, however, been found in many instances to be difficult, if not impossible, to obtain the required structural stiffness without the addition of so much mass to the armature structure assembly that the desired accelerations cannot be obtained so that other expedients must be used. In the case of flexure resonances, which introduce large reactive forces on the armature, past practice has been to "detune" or shift the critical frequency of the armature assembly by loading the supporting flexures with weights. Such weights are manually slidable along the flexures so as to change the resonant point and therefore are only a partial solution as it is necessary to stop the operation of the shaker to shift the position of the weights which makes it impossible to subject the test load to a test cycle wherein the frequency of operation is continuously varied over a wide band or range.

More recently, flexures operating over variable frequency ranges without exhibiting resonances sufficiently severe to produce large reactions on the armature have been developed, as covered for instance in co-pending application of Peter Zerigian entitled "Vibration Generator," Serial No. 558,922, filed January 13, 1956.

Resonances internal to the armature structure also occur, generally below 2000 C. P. S. in structures similar to those shown in United States Letters Patent 2,599,036. In operating over wider frequency ranges it is required to build more rigid structures to increase the frequencies, and such structures exhibit less internal damping than the composite constructions shown in the drawings of the referenced patent. The reduced damping causes destructive resonances and impairment of operation of the shaker in its primary function of moving an attached load.

It is accordingly the principal object of this invention to provide apparatus for imparting a reciprocating movement to a test load which can be operated over a wide continuous range of frequencies without excessive or destructive oscillations or forces being set up in the armature assembly.

Apparatus according to the present invention comprises a magnetized core structure including an air gap across which is produced a unidirectional magnetic flux. Disclosed in the air gap is an alternating current carrying winding of an armature assembly that is longitudinally movable with respect to the core structure so that reciprocating forces are imparted to the armature assembly by the interaction of the alternating flux of the armature winding and the unidirectional flux across the air gap of the core structure. The armature assembly is interconnected with the test load by a test table or a suitable type of coupling or connector, and the reciprocating forces originating on the coil act on the armature and attached load to produce reciprocating motions. To prevent excessive amplitude of oscillations and the build up of destructive forces, when operated at or near the resonating frequency, the armature assembly preferably is damped both mechanically and electrically. Mechanical damping is provided by the inertia of the mass of a weight, which is resiliently mounted with respect to the remainder of the armature assembly along its longitudinal axis by two deformable members or blocks of a resilient, yieldable material such as soft rubber. The blocks are disposed in abutting relationship to the opposite ends of the weight and adjacent portions of the assembly so that the weight's inertia alternatively compresses one or the other of the blocks as the armature assembly is moved axially in opposite directions. The electrical damping is provided by the flow of electrical currents through an electrical path of low ohmic resistance carried upon the armature assembly in a location so as to be disposed in the air gap. The low resistance path can be either in the form of an electrical winding having one or more short circuited turns or alternatively as a portion of the armature assembly structure itself if such portion is constructed of an electrically conducting material such as aluminum, having a low electrical resistance.

When the reciprocating forces originating in the armature winding correspond to the natural frequency of the longitudinal mode of resonance, very high amplitudes of motion may result, in which the armature coil moves in opposition to the test table and attached load, alternately stretching and compressing the interconnecting structure. The above electrical and mechanical damping means cooperate to limit the opposing motions of the armature and table ends, respectively, of the armature structure. The tendency near the resonant frequency for the armature coil amplitude to increase for a given force input causes damping currents to be induced in the shorted turns of the armature, which currents through interaction with the D. C. field flux cause damping forces to act on the coil end of the armature structure. At the same time, damping forces are exerted on the table end of the structure through working of the rubber mounting of the weight, occasioned when the amplitude of the table increases along with that of the armature coil. It has been found that the combined effect of these damping means is considerably greater than would be expected by the simple addition of their separate results.

Mechanical damping is also applicable to the longitudinal struts connecting the coil and table, in order to suppress the vibratory disturbance caused by resonant bowing of the long struts. The strut dampers comprise masses in the form of flat plates which are mounted on each side of, and separated from the strut by a layer of rubber or other resilient material. The plates and rubber are preferably recessed into the strut to allow withdrawal through slots in the coil gap. The two plates are tied together by means of recessed members passing through the rubber material and through a clearance hole in the strut, large enough to allow substantial relative motion between the plates and the strut.

These and other objects and aspects of the invention will be apparent from the following description of several specific embodiments of the invention which refer to drawings, wherein:

Fig. 2 is a sectional view on line 2—2 of Fig. 1;

Figure 1:
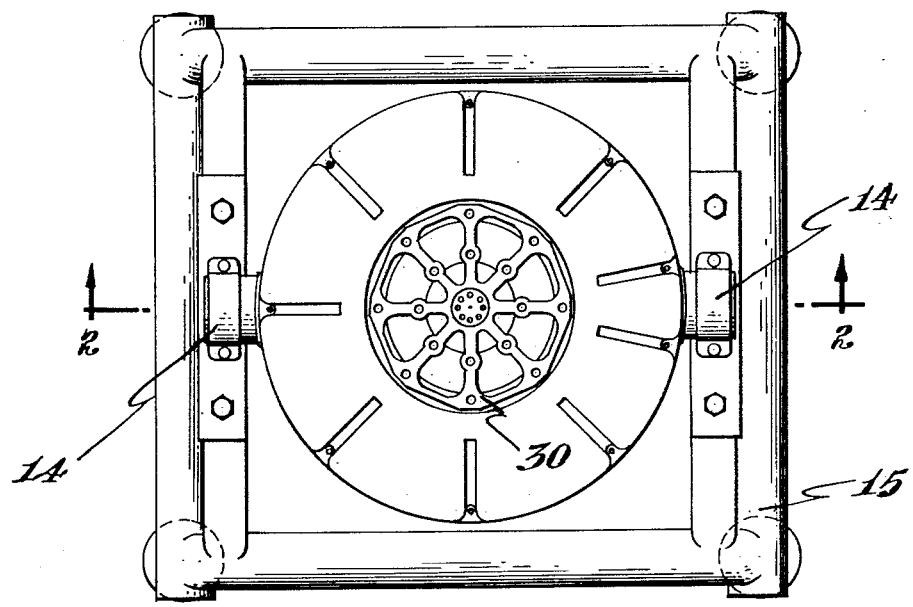
Fig. 1 is a plan view of a first embodiment of the invention.

As can be best seen in Figs. 1 and 2, the first embodiment of the invention comprises a core structure 10 of a low magnetic reluctance material such as soft iron. The core structure 10, which is generally cylindrical in shape, is supported upon two diametrically projecting trunnions 12 which are journalled in bearings carried on pedestals 14 (Fig. 1) in a fabricated frame 15 forming no part of the present invention. Disposed within an annular cavity in the core structure 10 is a multi-turn direct current magnetizing winding 16 which is held in position by suitable non-magnetic spacers 18. To provide access to the annular cavity for the winding 16, the core structure 10 is split transversely to form an annular spaced cover plate 20 which is secured to the main body of the core structure by a plurality of bolts (not shown).

The inner portion of the core structure 10 forms a central pole piece 22 having a pole face 24, which is opposed to the face 26 of the aperture wall in the cover plate 20 to form a cylindrical air gap in the magnetic path of the core structure. A unidirectional magnetic flux is established across this air gap in the well known manner when a direct current flows through the winding 16.

An armature assembly 28 is supported so as to be movable reciprocally in a longitudinal direction with respect to the core structure 10 by means of ring flexures 40 which are generally similar to the flexure described and claimed in the copending application Serial No. 475,230 of Efromson, filed December 14, 1954. The flexures are enclosed by housings 41 and 43, the lower of which supports a ventilating blower 45 for causing a flow of cooling air over the winding 16 and through the air gap.

The armature assembly 28 comprises an octagonally shaped table 30 to which a test load (not shown) to be vibrated is attached. The table 30 is attached by bolts 32 to the upper ends of eight elongated members such as the struts 34 which extend through respective clearance holes leading into the core cavity opposite the air gap. The lower ends of the struts 34 are recessed to receive an armature coil 36 into which an alternating current can be introduced through flexible conducting leads (not shown).

The flow of an alternating current through the armature coil 36 results in an alternating flux which interacts with the unidirectional flux across the air gap to set up resulting forces so that the armature assembly 28 reciprocates along its longitudinal axis in the well-known manner at a frequency corresponding to the frequency of the power supply of the current in the armature coil.

If the power supply frequency approaches that of the natural frequency of the armature assembly 28, a resonant condition results with greatly increased amplitude of longitudinal movement of the armature assembly accompanied by the setting up of forces which may cause damage or destruction of the generator. To permit the operation of the generator at frequencies near or equal to what would ordinarily be such resonating frequency, the lower end of the armature assembly is electrically damped by encircling the conductor armature coil 36 with a thin sheet of copper or other low resistance material in the form of a continuous ring 42 which acts as a single short-circuited turn. Currents are induced in the ring 42 both by transformer action from the armature coil 36 and by the motion of the armature assembly 28 relative to the flux in the air gap in the core structure 10. The currents produced by the armature movement are proportional to the velocity of such movement relative to the air gap so that the phase relationship is such as to introduce powerful damping when the armature assembly tends to resonate in the longitudinal direction. To minimize the losses due to the currents induced in the ring 42 by the above mentioned transformer action, a second larger short-circuited ring 44 of a low resistance material is positioned on the core structure pole face 26 which larger ring, through further transformer action, causes a substantial reduction of the induced flux and a corresponding reduction of inductance.

Figure 3:
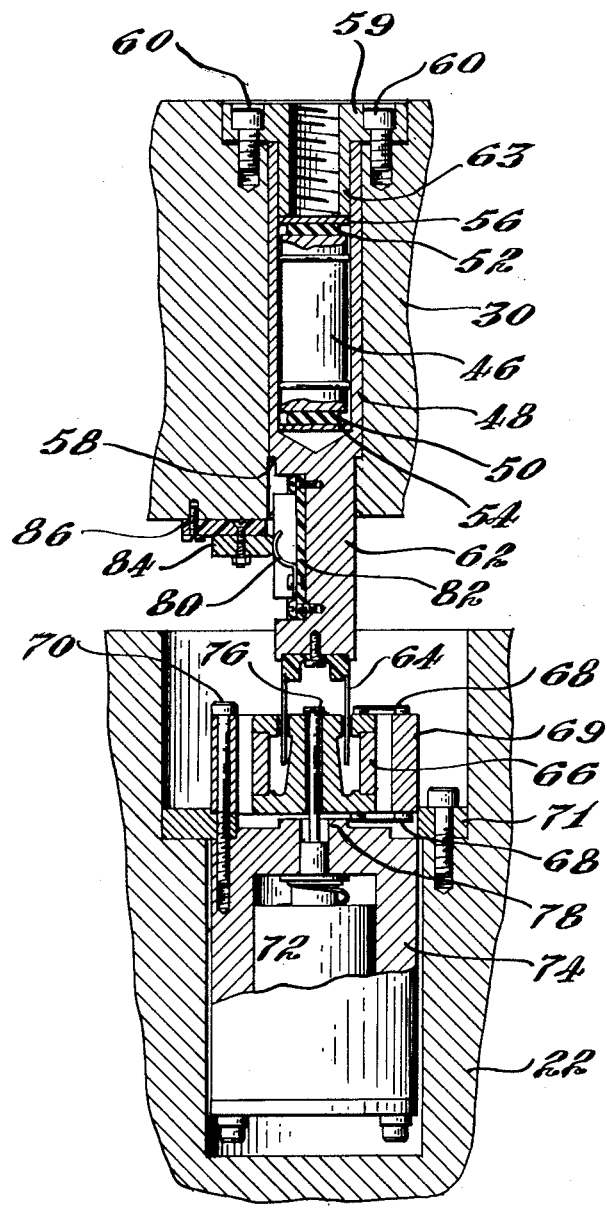
Fig. 3 is an enlarged fragmentary sectional view on line 3—3 of Fig. 2.

Because of the very large amount of energy, which is stored in the armature assembly 28 under resonant conditions, the above described electrical damping is in many instances not sufficient to control the armature assembly longitudinal movement and it is necessary to provide further damping. This may be provided mechanically by the mass of a cylindrical weight 46 which is sprung on the longitudinal axis of the armature assembly. As is best shown in Fig. 3, the cylindrical weight 46 is restrained so as to have two degrees of freedom in a hollow cylindrical member such as the sleeve 48 by two abutting deformable members or blocks 50 and 52 of a resilient material, e. g., rubber. The lower block 50 is interposed between the bottom of the weight 46 and a spacer 54 resting on the bottom of the recess in the sleeve 48. The uppermost block 52 is similarly interposed between the top of the weight 46 and a spacer 56. The sleeve 48 is held against a shoulder or lip 58 in a centrally disposed aperture in the test table 30 by a cap 59 which is secured in a recess flush with the top of the table by means of cap screws 60. The cap 59 has a downwardly extending boss 63 which bears against the spacer 56.

Extending downwardly from the sleeve 48 is an integrally formed extension 62 upon the end of which is carried the moving coil 64 of a signal generator. The coil 64 projects into the air gap of a signal generator permanent field magnet 66 which is mounted on the ends of flexible links 68. The opposite ends of the links 68 are secured to a ring 69 which is attached to a spacer 71 by bolts 70. The spacer 71 is in turn fastened to a shoulder in a recess in the central pole piece 22. The above described construction makes it possible to support the signal generator magnet 66 from the vibration generator core structure 10 without transmitting spurious movements of the structure to the signal generator at frequencies other than resonating frequencies of the flexible supporting system. At the latter frequencies, the signal generator is tied directly to the core structure 10 by the energization of an electric solenoid 72 so that the flexible links 68 are not effective.

The solenoid 72 is enclosed in a recess in a cylindrical housing 74 which is secured to the bottom of the spacer 71 by screws 70. The plunger 76 of the solenoid 74 projects upwardly through a central aperture in the housing head 78 and an aligned aperture in the signal generator magnet 66. In the deenergized position of the solenoid plunger 76 the magnet 66 is supported on the flexible links 68 with clearance between the plunger head and the top of the magnet as is shown in Fig. 3. When the solenoid 74 is energized, the plunger 76 is retracted firmly to seat the signal generator magnet 66 upon the raised boss on the top of the housing head 78 so that the magnet is essentially attached to the core structure 10.

Electrical connections to the signal generator coil 64 are made by means of arcuate springs 80 (only one of which is shown in Fig. 3) carried upon an insulating plate 82 recessed in the sleeve extension 62. When the sleeve is inserted in the central aperture in the table 30, the springs 80 engage respective stationary contacts 84 secured to the bottom of the table by an insulating spacer 86.

Figures 4, 5:
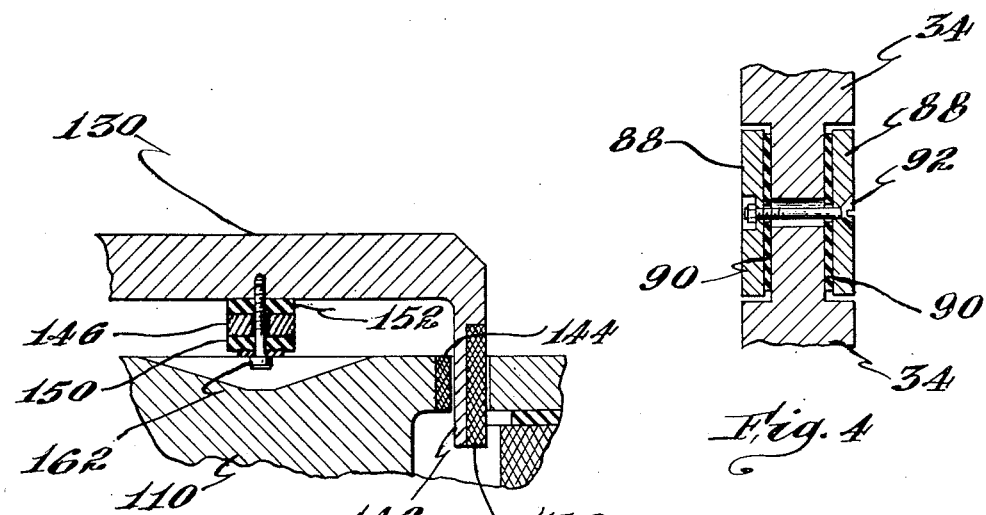
Fig. 4 is an enlarged fragmentary sectional view on line 4—4 of Fig. 2.
Fig. 5 is a partial sectional view of an alternative embodiment of the invention.

The details of the dampers for reducing the resonant bowing of the struts 34 are shown in Fig. 4. Damping is provided by the mass of two plates 88 which are disposed in opposed longitudinal recesses in each of the struts 34. A strip 90 of rubber is interposed between each plate 88 and the bottoms of the respective strut recesses. The plates 88 and strips 90 are maintained in position by a through bolt 92 extending through apertures therein and an aperture transverse of the axis of the strut. The diameter of the transverse aperture is great enough to permit relative movement between the plates 88 and the strut 34.

In Fig. 5 is shown a second embodiment of the invention wherein the test table 130 is located at the same end of the core structure 110 as the air gap so that the struts 34 used in the previously described embodiment are eliminated. The armature assembly in this second embodiment is further simplified by winding the armature coil 136 upon a skirt 142 which is integral with and depends downwardly from the periphery of the table.

It will be evident that the skirt being a moving short-circuited ring or winding of an electrically conducting material which is subjected to the flux in the air gap serves the same damping function as the ring 42 described heretofore. The single turn compensating winding 44 of the first embodiment is replaced by a plurality of shorted turns 144 on the central pole face of the core structure 110.

The mechanical damping structure, although similar in function to that described above, is also of simplified construction. A central aperture is provided in the damping weight 146 which is aligned with corresponding apertures in the resilient blocks 150 and 152 to receive a cap screw 162. The shank end of cap screw 162 engages a threaded recess in the bottom of the table 130 so that the weight is movable axially in either direction upon the deformation of a corresponding block thereby acting as a mechanical damper at the resonating frequency of the armature assembly.

It should be understood that the present disclosure is for the purpose of illustration only and that this invention includes all modifications and equivalents which fall within the scope of the appended claims.

I claim:

1. Apparatus for imparting a reciprocating movement to a test load comprising a magnetized core structure including an air gap having a unidirectional magnetic flux thereacross, and a relatively movable armature assembly interconnecting with the test load and having an alternating current winding disposed in the air grap so that the alternating flux produced by the winding interacts with the unidirectional flux longitudinally to move the armature assembly, said assembly having damping means including a weight resiliently suspended at the center thereof and an electrically conducting portion disposed in the air gap an a short circuited coil for damping both mechanically and electrically the amplitude of the longitudinal movement of the armature assembly at its resonating frequency.

2. Apparatus for imparting a reciprocating movement to a test load comprising a magnetized core structure including an air gap having a unidirectional magnetic flux thereacross, a relatively movable armature assembly interconnecting with the test load and having an alternating current winding disposed in the air gap so that the alternating flux produced by the winding interacts with the unidirectional flux longitudinally to move the armature assembly, and electrical and mechanical damping means for the armature assembly, said mechanical damping means including a weight disposed coaxially with respect to the longitudinal axis of the armature assembly and deformable members of a resilient material abutting the opposite ends of the weight for restraining the axial movement of the weight relative to the assembly whereby the amplitude of the longitudinal movement of the armature assembly is damped at its resonating frequency.

3. Apparatus for imparting a reciprocating movement to a test load comprising a magnetized core structure including an air gap having a unidirectional magnetic flux thereacross, an armature assembly having a table for connecting with the test load and an alternating current winding disposed in the air gap so that the alternating flux produced by the winding interacts with the unidirectional flux longitudinally to move the armature assembly, said table having a centrally disposed aperture therethrough, and electrical and mechanical damping means for the armature assembly, said mechanical damping means including a recessed member inserted in the table aperture, a weight movably disposed in the recessed member and two deformable members of a resilient material abutting the respective ends of said weight for restraining its axial movement with respect to the armature assembly whereby the amplitude of the longitudinal movement of the armature assembly is damped at its resonating frequency.

4. Apparatus for imparting a reciprocating movement to a test load comprising a magnetized core structure including an air gap having a unidirectional magnetic flux thereacross, an armature assembly including a table for connecting with the test load and an alternating current winding disposed in the air gap so that the alternating flux produced by the winding interacts with the unidirectional flux longitudinally to move the armature assembly, said table having a centrally disposed aperture therethrough with an inwardly extending step adjacent the bottom thereof, electrical and mechanical damping means for the armature assembly, said mechanical damping means including an axially recessed cylindrical member inserted in the table aperture abutting the flange, a weight movably disposed in the recessed member, two deformable members of a resilient material abutting the respective ends of said weight for restraining its axial movement with respect to the armature assembly, one of said deformable members being interposed between one end of said weight and the bottom of the recessed member, and a cover plate for the table aperture the surface of which is flush with the table surface so that the other resilient member is interposed between the opposite end of said weight and the cover plate.

5. Apparatus for imparting a reciprocating movement to a test load comprising a magnetized core structure including an air gap having a unidirectional magnetic flux thereacross, an armature assembly having a table for connecting with the test load and an alternating current winding disposed in the air gap so that the alternating flux produced by the winding interacts with the unidirectional flux longitudinally to move the armature assembly, and electrical and mechanical damping means for the armature assembly, said mechanical damping means disposed beneath the center of said table and including a weight having a central aperture therethrough, deformable members of a resilient material located respectively at the opposite ends of said weight to restrain its axial movement, said resilient members having apertures which are aligned with the weight aperture, and a pin projecting through the aligned apertures into said table whereby the amplitude of the longitudinal movement of the armature assembly is damped at its resonating frequency.

References Cited in the file of this patent

UNITED STATES PATENTS

| | | |
|---|---|---|
| 1,619,677 | Pierce | Mar. 1, 1927 |
| 1,867,708 | Paton | July 19, 1932 |
| 2,016,207 | Lindenberg | Oct. 1, 1935 |
| 2,482,033 | Sevigny | Sept. 13, 1949 |
| 2,533,249 | Henson | Dec. 12, 1950 |
| 2,590,554 | Lukacs | Mar. 25, 1952 |
| 2,736,393 | O'Connor | Feb. 28, 1956 |